(12) United States Patent
Herberger et al.

(10) Patent No.: US 7,754,959 B2
(45) Date of Patent: Jul. 13, 2010

(54) SYSTEM AND METHOD OF AUTOMATICALLY CREATING AN EMOTIONAL CONTROLLED SOUNDTRACK

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 1258 days.

(21) Appl. No.: 11/292,234

(22) Filed: Dec. 1, 2005

(65) Prior Publication Data

US 2006/0122842 A1 Jun. 8, 2006

Related U.S. Application Data

(60) Provisional application No. 60/633,224, filed on Dec. 3, 2004.

(51) Int. Cl.
*G10H 7/00* (2006.01)
(52) U.S. Cl. .............. 84/626; 84/601; 84/604; 84/609; 84/622; 84/634
(58) Field of Classification Search .............. 84/626
See application file for complete search history.

(56) References Cited

U.S. PATENT DOCUMENTS

| | | | |
|---|---|---|---|
| 5,877,445 A | 3/1999 | Hufford et al. | |
| 6,072,480 A | 6/2000 | Gorbet et al. | |
| 6,084,169 A | 7/2000 | Hasegawa | |
| 6,608,249 B2 | 8/2003 | Georges | |
| 2002/0134219 A1* | 9/2002 | Aoki | 84/609 |
| 2003/0159565 A1 | 8/2003 | Kawashima et al. | |
| 2003/0159566 A1 | 8/2003 | Sater et al. | |
| 2003/0236716 A1 | 12/2003 | Manico et al. | |
| 2004/0025668 A1 | 2/2004 | Jarrett et al. | |
| 2004/0027369 A1 | 2/2004 | Kellock et al. | |
| 2004/0056882 A1 | 3/2004 | Foreman et al. | |

* cited by examiner

*Primary Examiner*—Jeffrey Donels
*Assistant Examiner*—Christopher Uhlir
(74) *Attorney, Agent, or Firm*—Fellers, Snider, Blankenship, Bailey & Tippens, P.C.; Terry L. Watt

(57) ABSTRACT

There is provided herein a system and method for enabling a user of digital video editing software to automatically create an emotionally controlled soundtrack that is matched in overall emotion or mood to the scenes in the underlying video work. In the preferred arrangement, the user will be able to control the generation of the soundtrack by positioning emotion tags in the video work that correspond to the general mood of each scene. The subsequent soundtrack generation step will utilize these tags to prepare a musical accompaniment to the video work that generally matches its on-screen activities.

9 Claims, 6 Drawing Sheets

FIGURE 3
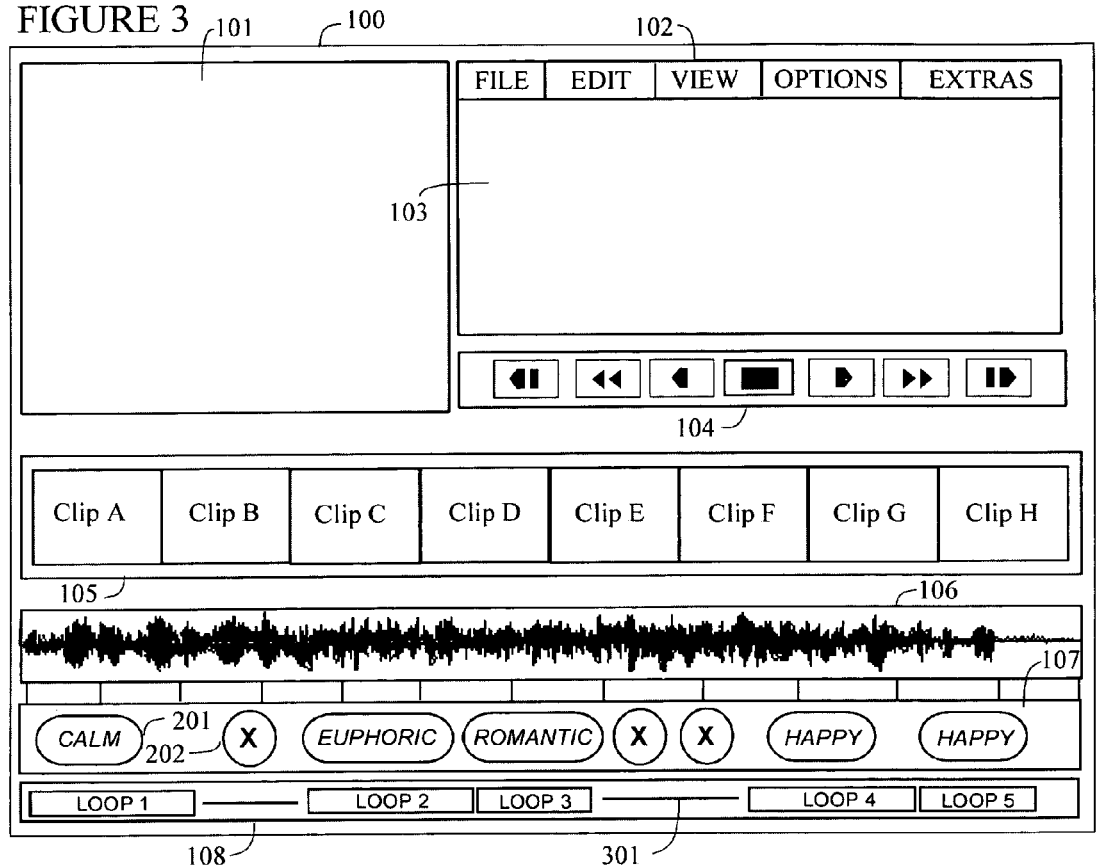
FIGURE 4
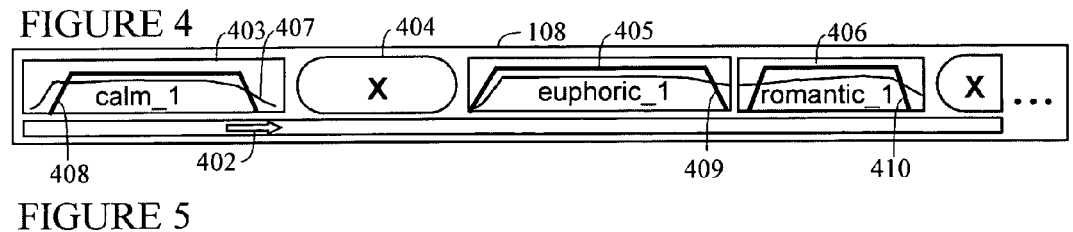
FIGURE 5
| | TAG | LENGTH | KEY | SPEED | FLAG | |
|---|---|---|---|---|---|---|
| LOOP 1 | funny happy | 16 beats 32s | E minor- 3/4 time | 84 bpm | ⊗ | |

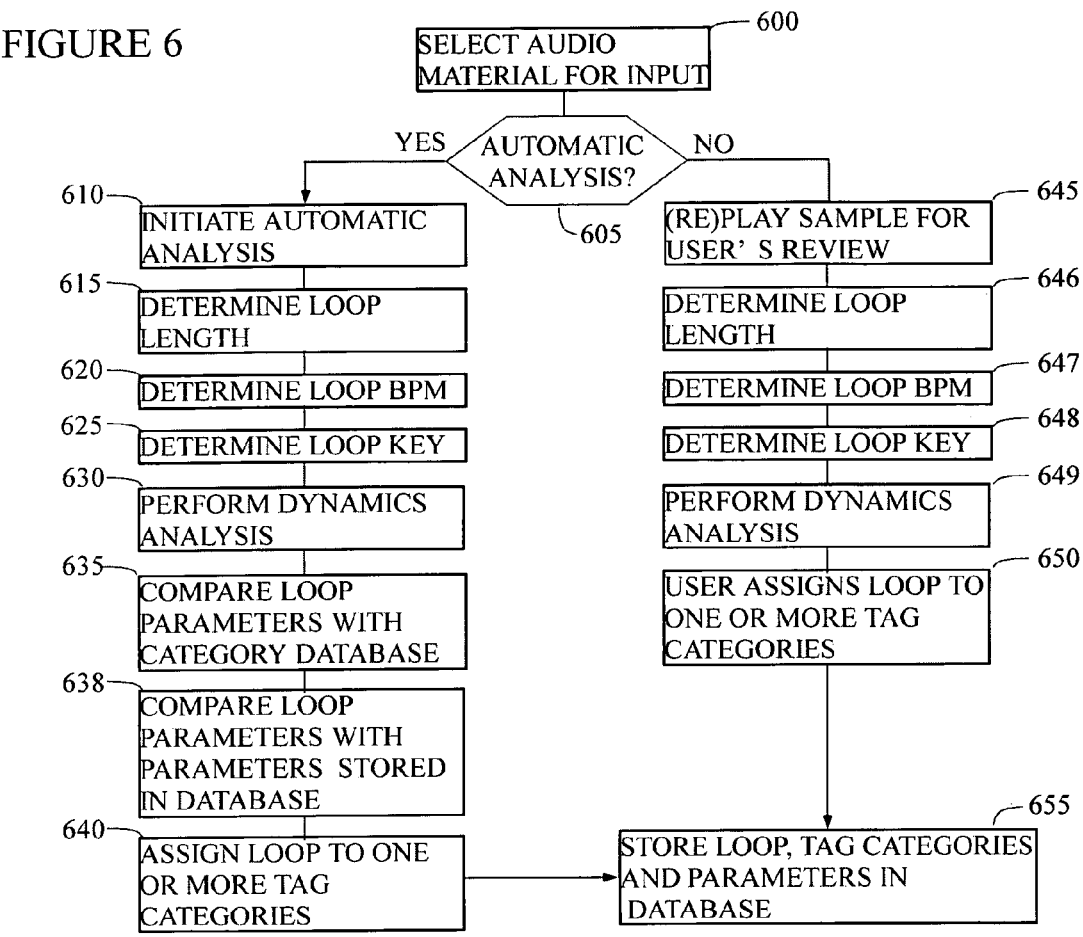
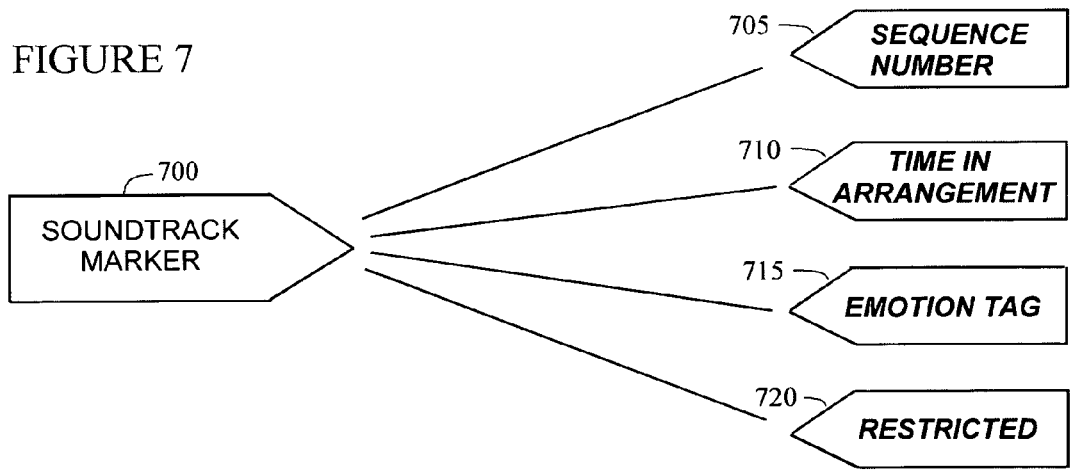

SYSTEM AND METHOD OF AUTOMATICALLY CREATING AN EMOTIONAL CONTROLLED SOUNDTRACK

RELATED APPLICATION

This application claims the benefit of U.S. Provisional Patent Application Ser. No. 60/633,224 filed on Dec. 3, 2004.

FIELD OF THE INVENTION

The present invention relates generally to the field of editing and organizing video material and its accompanying music soundtrack. More particularly, but not by way of limitation, the present invention relates to methods of creating a sound track to accompany a pre-existing video work.

BACKGROUND OF THE INVENTION

In recent years the widespread adoption by the general public of personal computers and digital cameras combined with enhanced interconnectivity between these devices has created a corresponding desire in these users to record digital home movies and, additionally, to edit these recordings to create home-made family DVDs. Of course, it is well known that a properly edited video work is much more entertaining and enjoyable for the viewer than raw (i.e., unedited) video footage which often contains sections of unusable or irrelevant material. Additionally, to the extent that background music, effects, etc., are added to the project, the work can take on a near-professional quality which, for some individuals, is its own reward.

Of course, the software industry has been quick to recognize that the increasing adoption of and growing interconnectivity between digital cameras and personal computers has created a marketing opportunity. More specifically, there are now a multitude of video editing programs which range in capabilities from high end feature-rich software—that is directed more toward the expert to lower/reduced functionality programs that are designed for the consumer market.

Driven largely by demands from the consumer market segment, there has been a general tendency in video editing software products to streamline the user interface and simplify program operations to a point where even the novice user can use the program. These advances in software usability have helped to further spur the amazing growth in personal computer-based digital multimedia editing.

It is well known that the video creation process typically involves selection and arrangement of a number of separate video clips into a single video work. During this process, the user will usually sort, cut, and arrange the video materials, add transitions and effects and, optionally, add background music to enhance the video work.

However, it seems that this last step—i.e., adding background music—has been largely neglected by the video editing software industry. Indeed, in those cases where some provision is made for the user to perform some basic audio editing of the video work, the tools that are offered within most video editing programs tend to be somewhat rudimentary, at least when viewed in comparison with dedicated audio editing programs. This oversight seems particularly glaring in view of the recognized importance of the soundtrack to the movie experience. A movie soundtrack contributes in many ways to the movie or video work including, for example:

Music helps set the mood for a movie scene in the same way that, for example, lighting is often used to set the mood for cinematography;

Music and additional sound effects help to drive the storyline by reinforcing the visual images (e.g., when one actor "hits" another a "thud" or similar sound is added in synchronization with the actors' movements to emphasize that action); and, Music helps set the time period and geographic locale ("period" music is often used to indicate the movie time period—e.g., a harpsichord playing a Bach composition could be used to indicate a renaissance setting—and, similarly, geographically distinct music is often used to place the setting in a particular region—e.g., oriental background might be used when the setting is Japan).

Most professionals that work in the movie business understand that the soundtrack—which might include ambient/background sounds, sound effects, music, etc.—can be as important to the success of a movie as its visual component. However, the average user of video editing software may not recognize this fact and may only deal with the audio portion of his or her video clips when forced to do so or as an afterthought, e.g., to cover instances where the actual video soundtrack picks up noise during recording to the point where the user has created a replacement track. That is, those of ordinary skill in the art will recognize that the audio track of home video recordings often include content that is not wanted, e.g., dialogue from strangers who were standing near the camera at the time of the recording, noise from nearby motor vehicles, wind noise, etc. To help overcome these sorts of ambient noise, video editing software often limits the user to filtering, cutting (muting), or replacing the existing soundtrack at designated locations. As compared with the video editing features in the same program, the range of audio editing capabilities tends to be quite limited.

As a consequence, some users have turned to stand-alone software that might offer, by way of example only, technology such as so-called "soundtrack generation". In soundtrack generation, a soundtrack is algorithmically created according to a strictly defined running time limitation and additionally, in some cases a "mood" parameter that may have been specified by the user before the music creation process is initiated. At first glance, these sorts of programs might seem to deliver all the functionality that is needed for the average user to edit the audio portion of his or her data. However, upon close examination these techniques can be seen to deliver only a limited solution to the above-mentioned problem.

One drawback to the conventional soundtrack generator is that the resulting soundtrack is defined in terms of a single global parameter setting (e.g., "emotion"), which is chosen to match the general subject matter of the entire video work. However, those of ordinary skill in the art will recognize that the emotions, situations, and scenes in a consumer video project usually change several times during its running time, and in the case of a much shorter home movie, these changes tend to occur at a higher frequency. Of course, it is the rare video work that is amenable to soundtrack creation using a single global setting of an emotion parameter. One obvious consequence of a misfit between a soundtrack and a video work is that favourable impact that a soundtrack might have is greatly diminished as compared with a musical work that is closely matched to the video action.

Thus, what is needed is a method for enabling a user to automatically create a music soundtrack that is shaped to match in a general way the action in the video portion of the work.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for automatically creating an emotion-controlled or influenced soundtrack for use with an existing video work, wherein the user will be able to place emotion-type identifier tags at a plurality of locations within the video work, the time location and emotive character of such tags being considered during the process of automatically/algorithmically creating an accompanying soundtrack. As a consequence, the automatically generated soundtrack will be a closer match to the changing content of the movie, thereby creating a more pleasant video experience for the user.

According to a preferred embodiment of the instant invention, there is provided a method of automatically creating an emotion-controlled soundtrack which begins with the selection of a completed video or photo-video (e.g., video slide show) work that has previously been created by the user. Thus, in the preferred embodiment the process of the soundtrack creation is initiated after the completion of the video editing process. The video work might have been completely created from scratch by the user or it may have been provided to the user in finished form ready to have a soundtrack created therefor. As a consequence, as used herein the term edited video work shall be interpreted as broadly as possible to include both works created by the end user and works supplied thereto. Additionally, this term should include instances where the user has selected the transitions and effects that are to be applied to the work, as well as those cases where the video is provided to the user with these items pre-specified. Note also that video work should be clearly understood to be a traditional full-motion work, as well as video works that consist partially or entirely of static images.

As a next preferred step, the user will be presented with a menu from which he or she will be able to select from a variety of music styles, preferably including styles such as blues, rock, dance, etc. The selection menu also preferably offers the user a listing of the emotion tags that are associated with each music style. The user will therefore be able to quickly determine which emotion tags are associated with each music style. Further, in some embodiments, the user will be able to reassign each tag to a new or different music style.

The user will next preferably select an appropriate music style and the instant invention will place the corresponding emotion tags into the on-screen video track of the graphical user interface. Thereafter the user will preferably be given the option of moving the tags to any time position in the video work if necessary or desired to, for example, support a specific video scene.

In another preferred embodiment, the user will not need to select a specific music style at the outset, instead the user will place emotion tags at arbitrary locations within the video work by selecting a tag from the database provided and then placing it according to the changing video content. For example, in a wedding video, the musical soundtrack for a scene that was taken at the reception that features a view of the wedding guests would usually be best matched by music with a euphoric/light hearted mood. On the other hand, a scene from the same wedding in which the bride and groom move to the altar would be best accompanied by music with a romantic or calm/sedate theme. In this step, the user applies his knowledge of the video work to define and place emotion tags throughout the whole video work. Additionally, at this stage the user will also be able to define scenes wherein the soundtrack is preferably silent, for example when the father of the bride speaks.

As a next preferred step, the user will initiate the automatic soundtrack creation process. In response, the instant invention preferably browses the video work in a sequential fashion from the start to the end and compiles a list of the tags previously defined by the user.

Given a listing of the tags, the compiled list is preferably processed by selecting appropriate musical loops out of a database. The loops are preferably of a length that corresponds to an integer number of musical beats, thereby making it easier for the loops to be integrated into the soundtrack as is described below. As was indicated previously, preferably the loops will—be stored in a database such that each loop can be associated with at least one of the emotion tags that are available to the user.

Next, the instant invention preferably uses the compiled list of markers as a framework for creating the soundtrack for the selected video work. After connecting to the database, the instant invention will preferably fill the soundtrack by sequentially selecting music loops from the database and inserting the selected loops into the audio track according to the designated emotion pattern as defined by the emotion tags. The selected music loops will preferably be cut, looped, cross-faded, etc., to create a seamless audio soundtrack. Additionally, in some embodiments the instant invention will automatically insert fade-ins or fade-outs before and after music loops to smooth the audio transitions into/out of a section of the video soundtrack that has been marked as "silent".

As a next preferred step the user will have the option of reviewing the quality of the newly created soundtrack in combination with the video material. Then, if the user approves the soundtrack, the complete project—including both video and audio data—can be written to a storage medium. Additionally, in some preferred arrangements, rather than storing the full audio sound track, the data (emotion tags, tag times, loop names/identifiers, transition types, etc.) that defines the soundtrack will be stored. That is, the information that will be stored would be sufficient to recreate the soundtrack provided that there was access to the selected loops. This would obviously be an advantage if storage space were at a premium, if the audio were to be transmitted over a slow communications link (e.g., uploaded/downloaded via modem), during the soundtrack creation process (to allow quick storage/retrieval), etc.

It should be clear that an approach such as that taught herein would be a tremendous aid to the user in his or her attempts to create a professional-looking and—sounding home movie in that, with very little effort, a polished soundtrack that is matched to the general activity level/emotional content of the underlying video work could be added. Whereas in the past the soundtrack has often been neglected by the novice because of the difficulties inherent in creating same, the instant method is specifically designed to require only minimal guidance from the user and, as a consequence, that the soundtrack creation process becomes simple enough that even a novice can produce one that is generally matched to the emotion content of the associated video work. Further, because the user can separately define and position each emotion tag, the character of the resulting soundtrack will benefit from the user's knowledge of his/her own video work.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

BRIEF DESCRIPTION OF THE DRAWINGS

Other objects and advantages of the invention will become apparent upon reading the following detailed description and upon reference to the drawings in which:

FIG. 3 illustrates the graphical user interface of the instant invention at a third phase.

FIG. 4 depicts a magnification of the specific section of the graphical user interface responsible for the implementation of the instant invention.

FIG. 5 depicts a simplified illustration of the database entry and structure for a selected loop.

FIG. 6 contains a flowchart which illustrates the specific steps during the automatic analysis of input material.

FIG. 7 depicts the internal data structure of a defined soundtrack marker.

DESCRIPTION OF THE PREFERRED EMBODIMENTS

Figure 1:
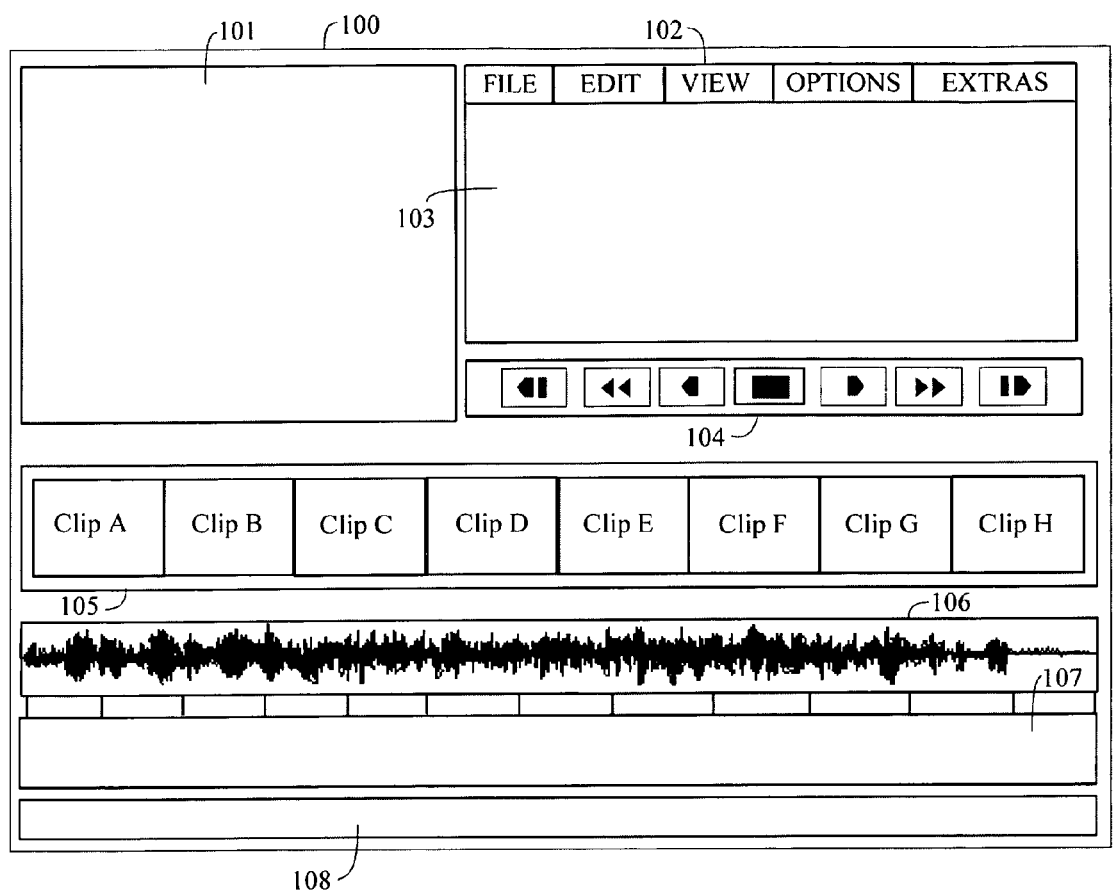
FIG. 1 illustrates the graphical user interface of the instant invention in a first phase.

Referring now to the drawings, wherein like reference numerals indicate the same parts throughout the several views, there is provided a preferred system and method for automatically creating a soundtrack for an existing video work, wherein the audio track is matched to the mood, tenor, atmosphere, or emotion throughout the work.

Figure 12:
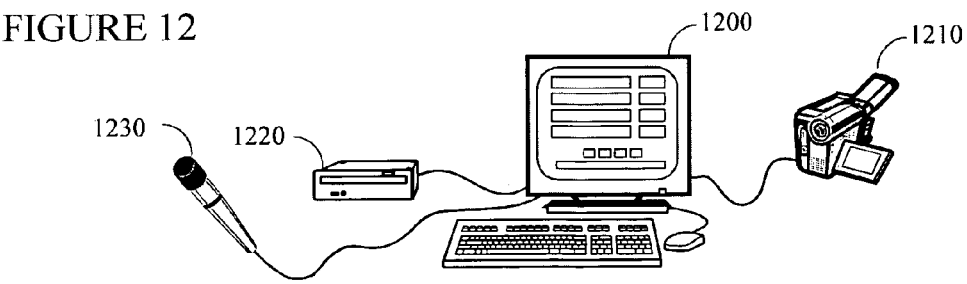
FIG. 12 illustrates a preferred environment for the instant invention.

As is generally indicated in FIG. 12, at least a portion of the instant invention will be implemented in the form of software running on a user's computer 1200. Such a computer will have some amount of program memory and hard disk storage (whether internal or accessible via a network) as is conventionally utilized by such units.

Additionally it is possible that an external camera 1210 of some sort will be utilized with—and will—preferably be connectible to—the computer so that video and/or graphic information can be transferred to and from the computer (FIG. 12). Preferably the camera 1210 will be a digital video camera, although that is not a requirement, as it is contemplated that the user might wish to utilize still images from a digital still camera in the creation of his or her multimedia work. Further, given the modern trend toward incorporation of cameras into other electronic components (e.g. in handheld computers, telephones, laptops, etc.) those of ordinary skill in the art will recognize that the camera might be integrated into the computer or some other electronic device and, thus, might not be a traditional single-purpose video or still camera. Although the camera will preferably be digital in nature, any sort of camera might be used, provided that the proper interfacing between it and the computer is utilized. Additionally, a microphone 1230 might be utilized so that the user can add voice-over narration to the multimedia work and a CD or DVD burner 1220 could be useful for read and/or storing in-progress or completed works.

Turning now to a detailed description of the instant invention, as an initial matter it should be noted and remembered that when the phrase "emotion controlled soundtrack" is used herein that usage should be understood to mean a soundtrack for a video work that includes at least one sequence that has been matched to the corresponding emotion, mood, action, feel, tenor, sense, atmosphere, theme, or other content of the video work, collectively the "emotion" or "mood" of the video work hereinafter. As will be made clearer below, the instant invention is designed to assist a user in creating a soundtrack that appears to have been prepared by a professional by automatically constructing same based on user-selected and positioned tags that have been selected to match the content of the video work (e.g. in a wedding home video, the bride's walk to the altar might be accompanied by a special music loop that underscores the emotion of the moment).

Turning first to FIG. 1, in a preferred arrangement a user will be presented with a graphical user interface of the general form of the computer screen display 100. Menu selections 102 provide an example of the sorts of options that such an interface might provide including options that allow the user to browse and add new material into the multimedia work via file browser 103. Additionally the user will preferably be initially provided with at least four on-screen tracks, one of which is designed to contain video information 105, one which is designed to contain the original audio data 106, one which is designed to contain the emotion markers 107 that are used in conjunction with creation of the generated soundtrack 108. Of course, the user will be expected to provide video clips for use in the video track 105 and also audio clips for inclusion in the original audio track 106. Those of ordinary skill in the art will recognize that the user will typically also supply the marker data in track 107. Note that, although for purposes of illustration only single audio tracks are shown in tracks 106 and 108 of FIG. 1, in most cases at least two audio tracks (e.g. stereo) would be utilized.

On-screen transport controls 104 are preferably styled to resemble their counterparts on a conventional VCR or DVD player and provide a way for the user to use a computer mouse to control playback of the multimedia work through the use of functions such as rewind, play, stop/record, fast forward etc. Those of ordinary skill in the art will recognize that such transport controls 104 are commonplace and well known in media editing programs. It is also typical in such programs to devote some portion of the screen to a view window 101 wherein the multimedia work may be displayed during the time that it is being created and edited.

Figure 2:
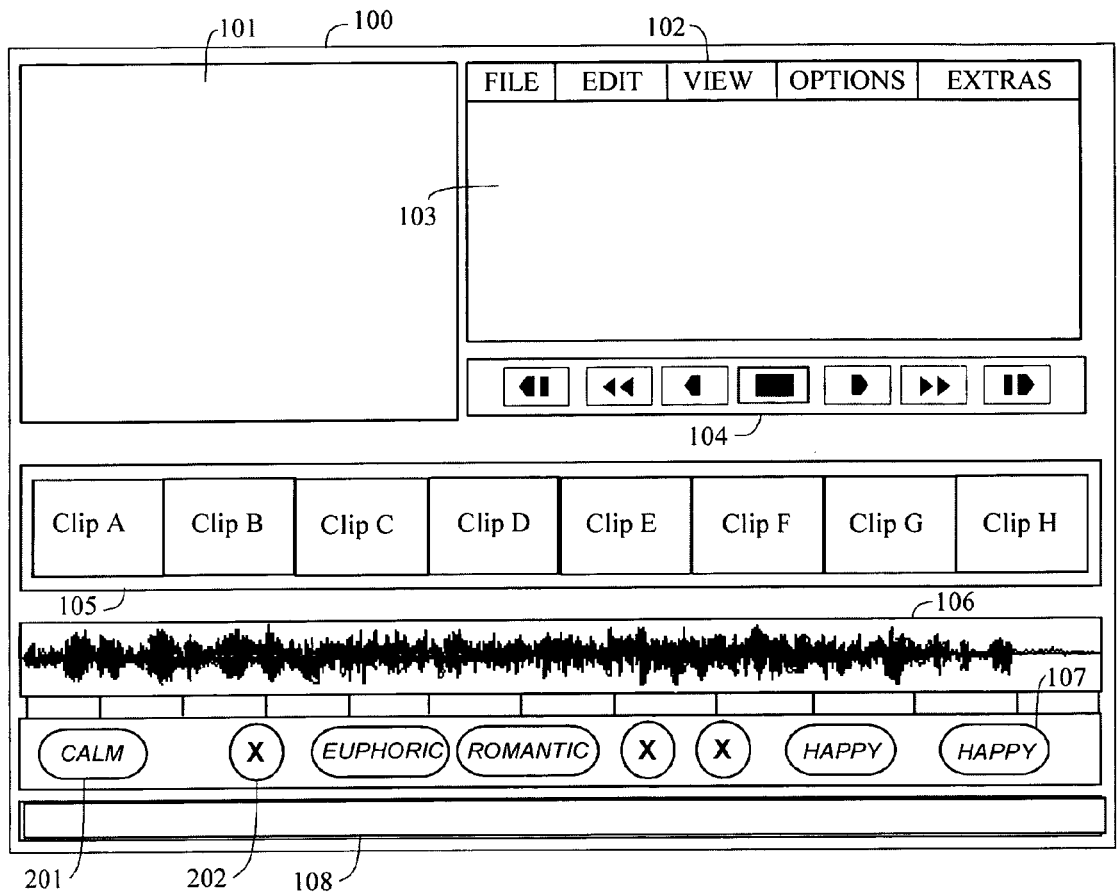
FIG. 2 illustrates the graphical user interface of the instant invention in a second phase.

Turning next to FIG. 2, this figure illustrates how the screen of FIG. 1 might appear after the user has selected soundtrack markers for a particular video work. In the preferred arrangement, the user will be able to manually define the time-position of the markers in the marker track 107 preferably to correspond with selected video scenes. For example, in FIG. 2 the user has selected the "calm" label 201 and placed it in the emotion track 107 in conjunction with video Clip A at a time approximately equal to the starting time of that clip. Of course, it is certainly possible that an emotion/mood tag might be applicable to multiple adjacent video clips (or only to a portion of a single clip) and preferably the user will be able to easily indicate such by specifying a starting and ending time for the tag.

Additionally it might be useful in some cases to have the original soundtrack 202 come to the forefront where, for example, there is an on-camera speech by a party guest. As is indicated in FIG. 2, in the preferred arrangement exclusion marker 202 will be used to indicate that no music will be layered on top of (or in replacement of) the video soundtrack. Of course, depending on the desires of the programmer and the user, the exclusion marker 202 could indicate that either no music will be added, or that the music soundtrack volume will lowered to a subtle/background level so that the content original soundtrack can be clearly heard. The creation of a smooth transition between the computer-generated and original soundtracks will preferably be handled automatically by the instant invention according to methods well known to those of ordinary skill in the art. In some preferred embodiments, the user will be able to define what sort of transition will be used to blend the computer-generated and original soundtracks together (e.g., fade out/fade in, cross fade, abrupt transition, etc.).

FIGS. 3 and 4 illustrate in more detail some preferred aspects of the soundtrack creation process. Turning first to FIG. 3, this figure illustrates a preferred screen layout after an emotional controlled soundtrack 108 has been created according to the markers in the corresponding marker track 107. As is discussed in greater detail below, music loops 1-5 have been automatically selected and inserted into audio track 108 by the instant invention according to the characteristics of the emotion markers, thereby honouring, of course, the user's wishes regarding those sections of the generated soundtrack that are to be kept silent or lower in volume (e.g., section 301). Preferably, the instant invention will create an audio soundtrack that is at least as long as the user's video work (or at least long enough to span the user's emotional tags) but, obviously, the user will be free to modify this to suit his or her own taste. Note that, in some embodiments the generated soundtrack might extend beyond the ends of the actual video footage (e.g., to provide a place at the start or end of the video work for scrolling titles, credits, etc.). In such cases, the video work will be assumed to extend to the end of the soundtrack, even if such extension merely adds sections of "blank" video to the work.

FIG. 4 illustrates a more detailed view of a portion of the preferred screen appearance of the emotional controlled soundtrack 108 after the soundtrack generation process has taken place. Preferably, a timeline 401 will be provided which uses a position indicator 402 to give the user some indication of the material that is currently being performed during editing and playback. As can also be seen, in the preferred arrangement the musical loops 403, 405 and 406 have been placed into the generated soundtrack track 108 according to the user's tag selections. Note that symbol 404 has been created to provide an on-screen representation of the exclusion marker 202. Additionally, and preferably, the selected loops feature the actual names within the loop database (e.g., "Loop 1" in FIG. 3 is seen to correspond to the file "calm_1" within the database). As might be expected, the musical loops 403, 405, and 406 have been selected according to the emotion markers. Additionally, those of ordinary skill in the art will recognize that each of the loops may need to be adjusted to match the specifics of the particular soundtrack (e.g., each might need to be adjusted in tempo, pitch, etc.). The specific details of these modifications will be described in greater detail below.

In the preferred embodiment, the on-screen display of the musical loops also includes additional visual information that is designed to help the user produce a better final product. For example, in FIG. 4 each music loop contains a curve 407 embedded therein that represents the time-varying volume level of that musical loop. Preferably the user will be able to interact with this curve via the common control options of a personal computer (i.e. computer mouse) to raise or minimize the volume level, adjust the fade-in/fade-out, etc., to suit his or her own taste.

Additionally, in the preferred arrangement video intensity curves 408-410 will also be displayed, wherein this curve illustrates the intensity and timing of the video fade in/fade out effect that will preferably be used to separate successive video clips. As might be expected, the user will preferably be able to change the parameters of this curve via the computer mouse.

FIG. 5 contains a schematic illustration of a preferred data structure for each of the music loops that are used by the instant invention. Note that this structure would be appropriate for use within the editing/music construction program as well as within the underlying database in which the loops are stored. Among the parameters that are preferably a part of each loop's data structure are the loop name 501, one or more designators or tags 502 that describe the emotional character 503 of the loop (note that one musical loop can be classified into more than one emotional category), the length 504 of the loop (preferably measured both seconds and beats 505), the key 506 and optionally the time signature 507 of the loop, the loop tempo 508 (preferably defined in beats per minute 509), and, finally, preferably there will be a flag 510 that indicates whether the loop has been utilized in the current composition (e.g., the symbol 511 in FIG. 5 indicates that it has not been used as of yet). The method by which this sort of information is entered into the database is described in greater detail below.

Turning next to FIG. 6, this figure contains an overview of a preferred operating logic of the automatic analysis procedure that is preferably used by the instant invention to add loops to the database. This sort of automatic analysis is one preferred way for a user to add new audio material to a loop database and/or create his or her own database from previously recorded material (e.g., material found on CDs, DVDs, etc).

As a first preferred step 600 the user will select audio material for input. Those of ordinary skill in the art will recognize that the audio material might take many forms, but preferably it will be a .WAV, .MP3, or other digital music file stored on disk or other nonvolatile storage medium, such medium preferably being either attached directly to the user's computer or accessible via network. Next, the user will preferably select whether the classification of the selected loop(s) will be manual or automatic (step 605).

In the automatic analysis branch, the instant invention will preferably begin by initiating the automatic analysis 610 routines and determining various parameters of the selected loop including, without limitation, its length 615, its tempo (preferably in BPM, step 620) and its key 625. These performance parameters may be readily determined automatically according to methods well known to those of ordinary skill in the art.

Additionally, and optionally, an automatic analysis will include an examination of the dynamics 630 of the musical loop. Although many features of a sound loop might be examined in connection with a dynamics analysis, preferably at least the volume range and/or overall volume level of the loop will be determined. Clearly, knowledge of a parameter of this type will make it easier to produce a pleasing music soundtrack that does not suffer from substantial loop-to-loop volume variations.

As a next preferred step the parameters determined during the previous steps will be compared with a database of parameter combinations and associated moods to see whether it can be automatically assigned to an emotion category. As is described in greater detail below, where it is possible to do so the loop will be associated with an emotion category depending on its BPM, key, time signature, etc. In the preferred embodiment, a table will be provided along with the software that implements the instant invention that relates these parameters (and potentially others) to the emotion tags. Preferably, this table will have been prepared by the software designer. As some examples of how the parameters of the music might be related to mood, consider that music that is slower (e.g., at a tempo of about 60 to 80 BPM), written in a major key (e.g., G), and in 4/4/ time will tend to be more useful in calm/low energy scenes. Conversely, music quicker (e.g., 90 to 110 BPM), that is in 2/4 time, and in a major key such as E flat will tend to be more useful in euphoric/celebratory scenes. As a final example, for tense scenes, minor keys (e.g., Am) and moderate tempos (e.g., about 70 BPM) are often useful.

Additionally, optionally, or alternatively, the instant invention will preferably compare the calculated loop parameter values with those already stored in the database (step 638). That is, it might be expected that all of the "happy" loops in the database would have a similar parametric signature (e.g., BPM, key, time signature, etc.). Thus, comparing the parameters of the currently selected loop against those that have already been classified (either by the end user or previously by the software designer) provides another way to automatically estimate a best emotional fitting to a given loop.

Next, the instant invention will preferably classify the selected loop (step 640) by assigning it to one or more emotion categories. Note that the results from steps 638 and 640 (if both methods have been used) can be combined in any number of ways. For example, one preferred scheme would be to classify the loop according to all of the categories produced by either method (i.e., a logical "OR" operation). In another preferred scheme, the loop will only be classified when both methods yield the same emotion tag(s) (i.e., a logical "AND" operation). In still another arrangement, a goodness-of-fit scheme will be employed to estimate how well the signature of the selected loop fits with the pre-assigned parameter values, and only those emotion tags having some degree of fit being assigned to the subject loop. Of course, those of ordinary skill in the art will recognize that there are many alternative methods that could be used to assign an emotion tag to a loop given one or more measured parameters.

As a next preferred step, the classification data is entered into the database (step 655) along with a copy of the loop itself and its performance parameters, if that has not-been done already, thereby making it available for use in the soundtrack construction process. Of course, those of ordinary skill in the art will recognize that the term "database" should be broadly construed to include traditional hierarchical and flat databases, as well as other organizations (e.g., a simple file name/directory—subdirectory structure) that allow loop and parameter data to be stored and withdrawn as needed.

As an alternative, and as is generally indicated in FIG. 6, in another preferred arrangement the user will be given the option of categorizing the loops according to his or her own taste and inclinations. In the event that the user selects the "no" branch, as a first preferred step some portion of the currently selected loop will be played for the user's review (step 645). Additionally, it is preferred that performance parameters such as loop length, BPM, key, dynamics, etc., also be automatically determined (steps 646-649), however the user could also be permitted to manually specify these parameters if desired (e.g., in some cases the user might wish to override the default BPM, thereby speeding up or slowing down the playing of the loop). Finally, the loop, its performance parameters, and its tag categories will preferably be written to a database (step 655).

Turning now to FIG. 7, wherein a preferred data structure of the emotion tags 700 is illustrated, note that this data structure is designed to contain the various parameters associated with a soundtrack marker. In more particular, the data structure preferably will include at least four different sorts of data. First, a sequence number 705 will preferably be provided to record the order in which each marker was inserted into the corresponding track. Additionally and preferably, the data structure will also include the time location 710 within the video work of the emotion tag. Some indication of the particular sort of emotion tag (e.g., happy, sad, etc.) will preferably be stored 715. Finally, preferably a restricted data field 720 or a similar indicator will be used to label tags that indicate that the original audio soundtrack—and not the newly composed music score—is to be heard at that point in the video.

Figure 8:
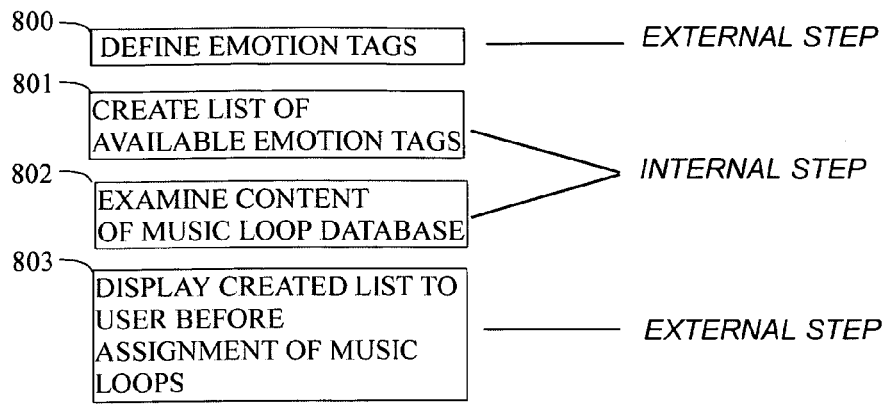
FIG. 8 illustrates the connection between the available musical loop material and the tag selection screen presented to the user by the instant invention.
Figure 9:
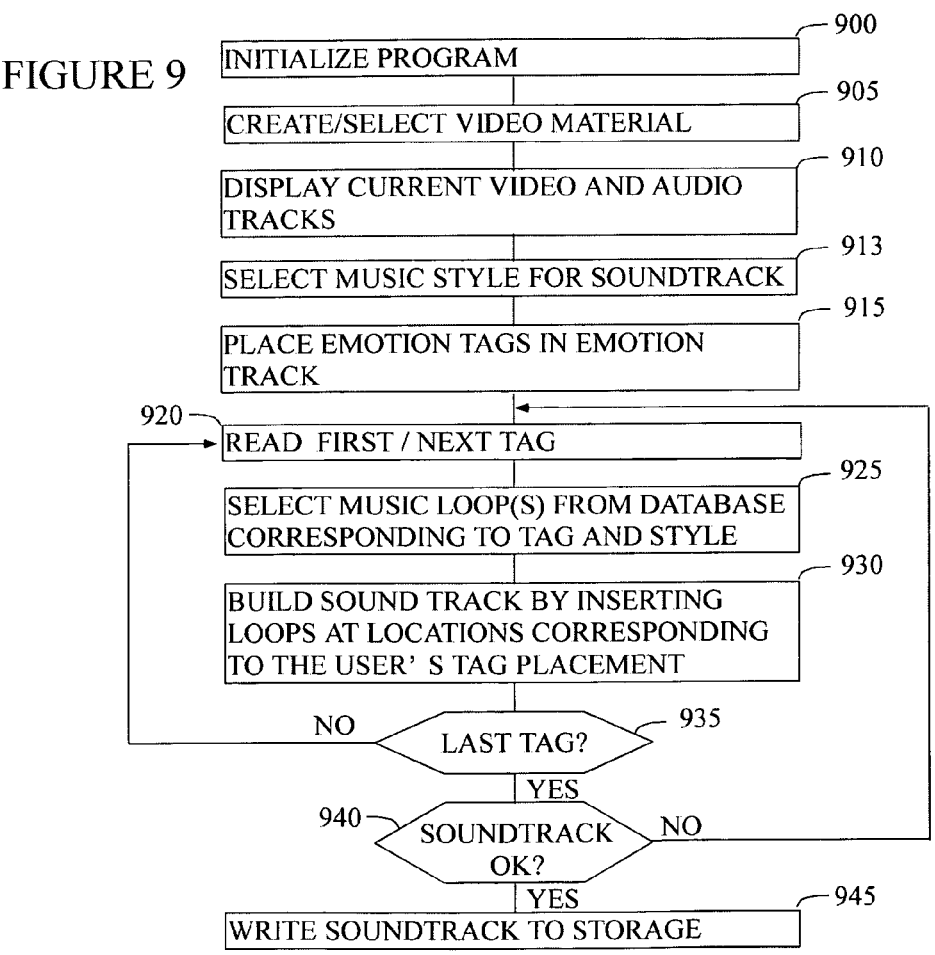
FIG. 9 contains a flowchart which illustrates some principal steps in the preferred method of the instant invention.

Additional information concerning the method of FIG. 7 may be found in FIG. 8. More particularly, FIG. 8 illustrates in a general way whether certain steps in the instant invention are preferably performed internal of or external to the editing program. For purposes of the instant disclosure, the term "external" is used to indicate that parts of the soundtrack generating workflow are carried out visibly to the user (the external part of the workflow, e.g., when input is required from the user), and "internal" is used to indicate those steps that take place outside of the user's ability to see them. For example, the definition of the various emotion tags will preferably be done manually by the user by working with the editing program (step 800). Therefore, this is an external step. The steps of determining the list of available tags 801 and examining the content of the music loop database 802 in preparation for an editing session (e.g., so that the user can be presented with a list of available tag types) most likely will be internal steps for the preferred software embodiment, as there is no indication of same to the user. The presentation to the user of a list of available tags (step 803) is preferably an external step FIG. 9 contains an overview of the simplified preferred operating logic of the instant invention. As a first preferred step 900 the program will be started and initialized according to methods well known to those of ordinary skill in the art. Next, the user will preferably create a video work or select a previously compiled video work (step 905). The method by which a custom video work is assembled and edited is not a primary focus of the instant invention and, as such, this process will not be discussed here. Further, those of ordinary skill in the art will be very familiar with video editing and thus, such technology need not be covered herein.

As a next preferred step, the instant invention will then display the video data and the original audio soundtrack in the corresponding tracks of the graphical user interface (step 910). Next, the user will preferably select a music style that is best suited to accompany the selected video work (step 913) or some portion thereof. In the preferred arrangement, the user will be presented with a listing of available music styles and, preferably, the list will also include a sub-listing of the emotion tags that are associated with each music style. That is, the "disco" style would likely be best used in connection with a "happy", "active", etc., emotion tag and would be less appropriate in sombre contexts. Of course, the user may (or may not, at the discretion of the program designer) be allowed to override the suggested tag/style associations. As is discussed in greater detail below, the selected music style acts as a guide to the instant invention in the generation of the soundtrack.

Note that, in another preferred embodiment, selection of a music style will select a completed music composition which is comprised of a number of music loops, each with its own associated emotion tag or tags. In this scenario, individual loops within the song will be lengthened (e.g., by repeating them), cut, or relocated as needed to match the user's tag placement within the video work. In some sense, the selected composition may be thought of as a matched set of loops from which a soundtrack can be constructed. This arrangement will help ensure that the completed soundtrack will have a consistent feel throughout.

After the selection of a music style, the instant invention will preferably next draw indicia of the embedded emotion tags in the corresponding region of the graphical user interface that is designed to receive such (e.g., a pallet-type menu of available tags will preferably be drawn on the user's screen). Then, and as a next preferred step 915, the user will select from among the tags provided and place them in the video track (or, in some embodiments, a separate emotion tag track) at positions that mirror the corresponding emotional content in the subject video. Preferably, that will be done by dragging a tag indicia from the pallet and dropping it in the appropriate track at a time location in the video work that signals the start of the currently selected emotion. Note that the instant invention should not be limited in its scope to the above identified method disclosed for specifying emotion changes in the video (i.e., drag-and-drop) but instead should be understood to include any alternative method of creating an association between tags and a video work. Further, note that in the preferred embodiment the user will not be limited to inserting tags between video clips (i.e., they can be inserted mid-scene), nor will the user preferably be required to specify tags throughout the entire video work (or up to its ending).

Figure 10:
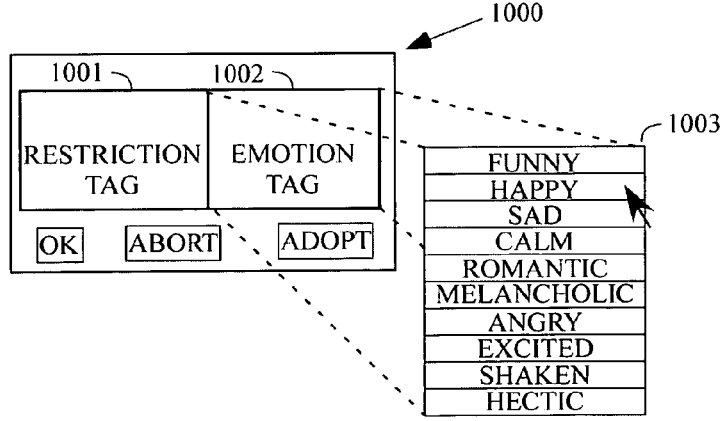
FIG. 10 depicts a toolbox graphical user interface presented to the user when placing the soundtrack tags.

FIG. 10 contains additional details concerning the preferred presentation of the tags to the user. As is indicated in this figure, in one preferred embodiment the user is presented with a toolbox 1000 that graphically illustrates the tag choices that are currently available within the database for the currently selected loop. As is indicated in this figure, the user will preferably be able to select from either a restriction tag 1001 or an emotion tag 1002. If an emotion tag is selected, a listing 1003 of the available tags will preferably be presented to the user (e.g., via a pop-up) from which he can choose the appropriate mood. Placement in within the video work then proceeds as has been described previously.

After the emotion tags have been placed, the user will initiate the process of creating the soundtrack (steps 920), preferably by selecting a menu option that provides that purpose. Upon receipt of this menu selection, the program will preferably sequentially process each of the user-positioned tags (steps 920-930). After reading a tag (step 920), the instant invention will preferably select one or more loops from the database that are suitable for use with the mood defined by the tag (step 925). Note that in many cases there will be a multiplicity of loops that could be drawn from the database (i.e., that match the emotion and musical style) and, in such a circumstance, the instant invention will select among them to create that section of the soundtrack. Those of ordinary skill in the art will recognize that there are many ways that such a choice might be made including, for example, a randomized choice. This would, of course, create the possibility that repeated runs of the program could produce different results given the same set of tags. This might be an attractive feature for some users. The exact means by which the soundtrack is created from a collection of chosen loops (step 930) will be discussed in greater detail below.

After the last tag has been processed (step 935), the user will preferably be given an opportunity to review the quality of the generated soundtrack (step 940). If the user is satisfied with the result, the instant invention preferably will store the soundtrack (step 945) on computer readable media of some sort (e.g., an attached hard disk drive as is generally indicated in FIG. 12). In the preferred embodiment, the instant invention will offer at least two user-selectable variations of storing the created soundtrack. In a first preferred variation, the instant invention will store the generated soundtrack (in audio form) together with the video work, preferably by writing it to the audio track(s) of the video work. Thus, in this embodiment a ready-to-play video work with accompanying sound track will be stored. Note that, although the sound track will preferably be made an integral part of the video work by writing it to the audio track provided for that purpose, it could also be written as a separate audio file (e.g., a MP3, WAV, AIF file).

In another preferred variation, only the definitions of the markers, their respective placement times, the BPM(s) of each loop, the musical key(s) of each loop, pointers to the storage locations of the selected loops, etc., will be stored. Thus, rather than storing the generated audio work itself, information sufficient to reconstruct the soundtrack will be stored instead. This second variation has as an advantage that the storage needs for the soundtrack will be much less compared to the storage needs of the first variation where the generated audio work is written to disk. However, the generated audio work created by the second embodiment will necessarily needed to be reconstructed from the stored markers, times, loops etc. during playback, making this option most attractive in the instance where a computer is used to play the stored video work.

Additionally as a third possible storage variant the instant invention will store the video work with the created soundtrack on any media which is readable by a DVD player (to include stand alone DVD players, computers with DVD drives, etc.).

If the user is not satisfied with the generated soundtrack the instant invention will preferably either regenerate the entire sound track (the "No" branch of decision block 940) or allow the user to replace any individual section of the track. Preferably, and as was suggested previously, a randomized loop selection process will be used so that each pass through steps 920-935 will result in a slightly different soundtrack.

Figure 11:
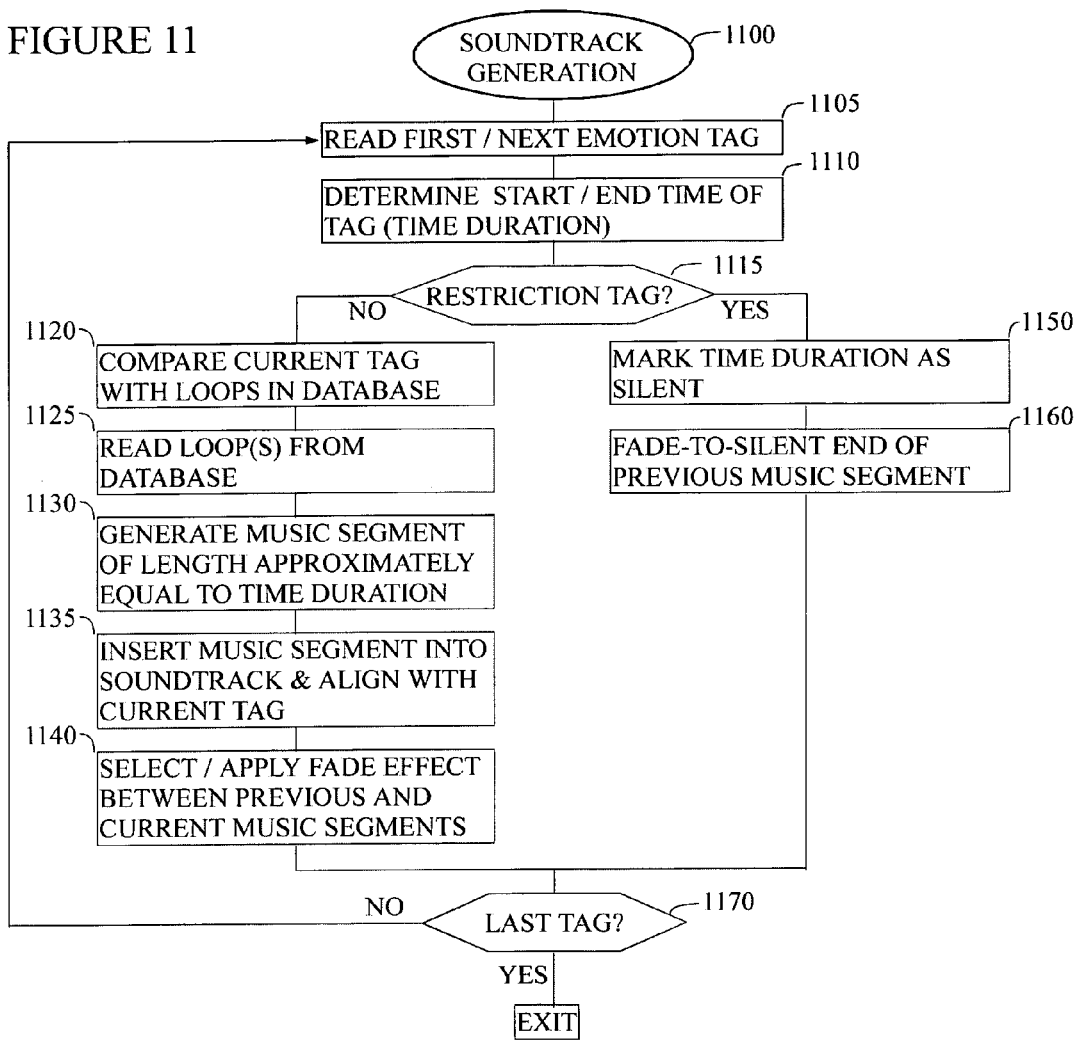
FIG. 11 depicts a flowchart which illustrates the logic of the instant invention during the implementation of the preferred method of the instant invention.

Turning next to FIG. 11, this figure contains a description of a preferred operating logic of the soundtrack generation aspect of the instant invention. As a first preferred step, upon receipt of the appropriate instruction from the user the instant invention will begin to sequentially examine each of the tags in the marker track (step 1105). During this examination, the instant invention will preferably determine the time-extent of each of the tags (step 1110). For example, this time extent might be calculated by measuring the interval between the current tag and the next later-time tag, the length of time between the last specified tag and the end of the video work, etc.

Next, a determination will preferably be made as to whether or not the currently selected tag is a restriction tag or an emotion tag (step 1115). In the event that the tag is a restriction tag (i.e., the user has indicated that the music is not to be played), the "YES" branch of FIG. 11 will be taken. Given that a restriction tag has been identified, the corresponding time interval will preferably be marked as being silent (i.e., no music will be added to the sound track, step 1150). Additionally, and optionally in some preferred embodiments, the instant invention will create a fade-out of the sound track at the start of restriction interval. This will help smooth the transition between a music-accompanied section of video and one with no soundtrack.

If the currently selected tag is not a restriction tag (the "NO" branch of decision box 1115), the instant invention will preferably continue by comparing the current tag with the loops that have been stored in the loop database (step 1120). As has been discussed previously, the loops that are stored in the database will typically be specially prepared digital sound files that have been edited and stored together with a listing of various of their parameters (e.g., BPM, pitch, sample rate, etc.). Further, each loop will be associated with one or more different emotions/moods. Thus, when the instant invention seeks to determine the loops in the database that are suitable to accompany video having a particular mood, such may readily be determined by reference to the database. Clearly, and as has been discussed previously, a loop may be associated with any number of different moods.

Note that when there are more loops available to be played than is available in the allotted time, the instant invention will make a determination (in connection with step 1120 or at some other point) as to how best to deal with this situation. In one preferred embodiment, a single loop will be selected for use during the time interval of interest, with the selected loop being repeated as many times as is necessary to fill the available time. This choice might be made randomly, in consultation with the user, according to a predefined selection order, etc. In other preferred embodiments, a plurality of loops will be selected, with the intent that they will be combined in some order (random, predefined, etc.) to cover the time interval under consideration, such coverage might require that each of the loops be repeated, shortened, etc. In other preferred embodiments, each selected loop will be shortened, overlapped, or otherwise combined cover the subject time interval. Those of ordinary skill in the art will recognize that there are many ways of handling the circumstance where there are a multiplicity of loops that might be used in a given interval.

As a next preferred step, the instant invention will read from the database one or more of the loops that are identified in step 1120. Preferably, the characterizing parameters for this loop will be read at the same time (e.g., BPM, sample rate, key/pitch, time signature, etc).

Next, the instant invention will preferably generate the portion of the soundtrack that corresponds to the time interval under consideration (step 1130). As is indicated in FIG. 11, the music segment so generated should be at least approximately equal in length to the available time interval. However, to the extent that the segment is too long, an audio fade in/fade out can be added to the start and/or end of the segment to make it fit smoothly within the allotted time.

As a next preferred step 1135, the instant invention will preferably insert the music segment into the soundtrack and align it with the current tag start/end times. Preferably at this same time, an audio effect (step 1140) will be applied to the start or end of the segment to allow it to blend more smoothly with the segments that are before and after it. Those of ordinary skill in the art will recognize that many sorts of effects might be applied including, fade in/out, cross fade, etc. Of course, it is not necessary that a transition effect be applied and in some embodiments the user will be able to require that an abrupt transition between adjacent segments be made.

Finally, the instant invention will preferably continue until every tag has been processed (the "YES" branch of decision block 1170). Additionally, and as has been discussed at greater length previously, in some preferred embodiments the user will be given the option of reviewing the finished product and, if it is not satisfactory, causing the program to execute the logic of FIG. 11 again, thereby generating a new and different sound track. Clearly, the logic of FIG. 11 might potentially be performed many times according to the desires and tastes of the user.

CONCLUSIONS

Of course, many modifications and extensions could be made to the instant invention by those of ordinary skill in the art. For example in one preferred embodiment the user might be able to create a soundtrack that is to be played in concert with the original soundtrack of the video work, wherein at specific scenes the relative volume levels of the original soundtrack and the generated soundtrack are varied so as to emphasize either one or the other depending on the scene. Additionally it might be desirable to expand the user's options during the creation process by allowing the user to specify more than one type of emotion during a particular scene (e.g., "happy-excited", "happy-calm", "sad-romantic", etc.), thereby—further refining the mood choices. The program would then, as an example, look for those loops that had both of the desired tags associated therewith. Those of ordinary skill in the art will be able to devise many alternatives.

Finally, in still another preferred embodiment, the user will be able to use other types of tags (e.g., volume) which are not directly related to emotion but would still be useful in setting the mood. For example, during a chase scene, the background music might be expected to rise because there will likely be little dialog. A volume tag such as this would provide a user with an additional parameter that could be varied to control the impact and quality of the final product.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A method of automatically creating a soundtrack to accompany a video work, said video work having a time duration associated therewith, wherein there is provided a plurality of music loops, each of said music loops having at least one musical style associated therewith, comprising the steps of:
   (a) selecting a plurality of emotion tags, each of said emotion tags being associated with at least one mood and said selected plurality of emotion tags comprising at least two different moods and wherein at least one of said selected emotion tags is a restriction tag;
   (b) assigning each of said plurality of emotion tags to at least one time point within said time duration of said video work, said assignment of said selected plurality of emotion tags being made to at least approximately match a mood of the video work at each time point so assigned;
   (c) for each of said non-restriction selected emotion tags, selecting at least one of said music loops and said at least one music styles associated therewith, wherein at least one of said selected music loop's at least one musical styles is consistent with said selected emotion tag musical mood;
   (d) automatically generating a soundtrack to accompany said video work according to said assigned times, said selected emotion tags, and said selected music loops, wherein said generated soundtrack has a reduced volume level proximate to said at least one time points within said time duration of said video work associated with said at least one restriction tags.

2. A method of automatically creating a soundtrack according to claim 1, wherein step (d) comprises the step of:
   (d1) automatically generating a soundtrack to accompany said video work according to said assigned times, said selected emotion tags, and said selected music loops, wherein at times within said generated soundtrack proximate to said assigned restrictions tags, said generated soundtrack is silent.

3. A method of automatically creating a soundtrack according to claim 1, wherein step (b) comprises the step of:
   (b1) assigning each of said plurality of emotion tags to only one time point within said time duration of said video work, said assignment of said selected plurality of emotion tags being made to at least approximately match a mood of the video work at each time point so assigned.

4. A method of automatically creating a soundtrack according to claim 1, wherein step (c) comprises the step of
   (c1) for each of said non-restriction selected emotion tags, selecting exactly one of said music loops and said at least one music styles associated therewith, wherein said exactly one of said selected music loops has at least one musical style associated therewith that is consistent with said selected emotion tag musical mood.

5. A method of automatically creating a soundtrack according to claim 1, wherein said moods associated with said emotion tags are selected from a group consisting of happy, sad, romantic, quite, excited, scary, tense, frantic, contemplative, angry, nervous, and ecstatic.

6. A method of automatically creating a soundtrack according to claim 1, wherein said music styles associated with said plurality of music loops are selected from a group consisting of rock, swing, jazz, waltz, disco, Latin, country, gospel, ragtime, calypso, reggae, oriental, rhythm and blues, salsa, hip hop, rap, samba, zydeco, blues, and classical.

7. A method of automatically creating a soundtrack to accompany a video work, said video work having a time duration associated therewith, comprising the steps of:
   (a) selecting a plurality of emotion tags, each of said selected emotion tags having a mood associated therewith, said plurality of emotion tags taken together comprising at least two different moods, and wherein at least one of said selected emotion tags is a restriction tag;
   (b) assigning each of said selected emotion tags to at least one time point within said time duration of said video work;
   (c) for each of said selected non-restriction emotion tags, selecting at least one music loop associated therewith, each of said selected music loops having a style consistent with said mood of said associated emotion tag;
   (d) automatically generating a soundtrack to accompany said video work according to said assigned time points and said chosen music loops, wherein said generated soundtrack has a reduced sound volume level proximate in position to each of said at least one restriction within said generated soundtrack.

8. A method of automatically creating a soundtrack according to claim 7, wherein step (d) comprises the step of:
   (d1) automatically generating a soundtrack to accompany said video work according to said assigned time points and said chosen music loops, wherein at times within said generated soundtrack proximate to said assigned restrictions tags, said generated soundtrack is silent.

9. A method of automatically creating a soundtrack to accompany a video work, said video work having a time duration associated therewith, wherein there is provided a plurality of music loops, each of said music loops having at least one musical style associated therewith, comprising the steps of:
   (a) selecting a plurality of emotion tags, each of said emotion tags being associated with at least one mood and said selected plurality of emotion tags comprising at least two different moods and wherein at least one of said selected emotion tags is a restriction tag, each of said at least one restriction tags being associated with a predetermined period of time during which said soundtrack is silent;
   (b) assigning each of said plurality of emotion tags to at least one time point within said time duration of said video work, said assignment of said selected plurality of emotion tags being made to at least approximately match a mood of the video work at each time point so assigned;
   (c) for each of said non-restriction selected emotion tags, selecting at least one of said music loops and said at least one music styles associated therewith, wherein at least one of said selected music loop's at least one musical styles is consistent with said selected emotion tag musical mood;
   (d) automatically generating a soundtrack to accompany said video work according to said assigned times, said selected emotion tags, and said selected music loops; and,
   (e) performing, at least a portion of said video work and said generated soundtrack together.

* * * * *